United States Patent [19]

Hirosaki

[11] Patent Number: 5,056,429
[45] Date of Patent: Oct. 15, 1991

[54] BAR CODE PRINTING METHOD AND THE PRINTER
[75] Inventor: Yukihiro Hirosaki, Shizuoka, Japan
[73] Assignee: Tokyo Electric Co., Ltd., Tokyo, Japan
[21] Appl. No.: 381,836
[22] Filed: Jul. 19, 1989
[30] Foreign Application Priority Data
Jul. 20, 1988 [JP] Japan .............................. 63-180585
Jun. 15, 1989 [JP] Japan .................... 1-153104
[51] Int. Cl.⁵ .............................. B41J 9/42; B41J 5/00
[52] U.S. Cl. .................. 101/93.01; 101/93.04; 400/103; 400/120
[58] Field of Search .................. 400/120, 103, 70, 88, 400/618, 611, 691, 157; 101/93.09, 110, 288, 66–67, 93.01, 93.04

[56] References Cited
U.S. PATENT DOCUMENTS

| 4,057,015 | 11/1977 | Kodis | 101/349 |
| 4,094,244 | 6/1978 | Edwards | 101/66 |
| 4,315,460 | 2/1982 | Sato | 101/93.09 |
| 4,363,268 | 12/1982 | Sato et al. | 101/110 |
| 4,830,522 | 5/1989 | Sato et al. | 400/120 |
| 4,862,194 | 8/1989 | Uematsu | 400/120 |

Primary Examiner—Eugene H. Eickholt
Attorney, Agent, or Firm—Oblon, Spivak, McClelland, Maier & Neustadt

[57] ABSTRACT

A bar code printer according to the present invention is used for the printing of symbol guards to be printed on both sides of a bar code pattern leaving fixed margins, simultaneously with printing of the bar code pattern formed with the combination of wide lines and narrow lines having been standardized previously. Even if wrinkles on a thermal transcription ink ribbon occur in the vicinity of symbol guards provided on both sides of the bar code pattern, the wrinkles do not occur in the bar code printing region. It is therefore possible to perform high quality bar code printing with the bar code printer according to the present invention.

7 Claims, 6 Drawing Sheets

FIG.3
FIG.4
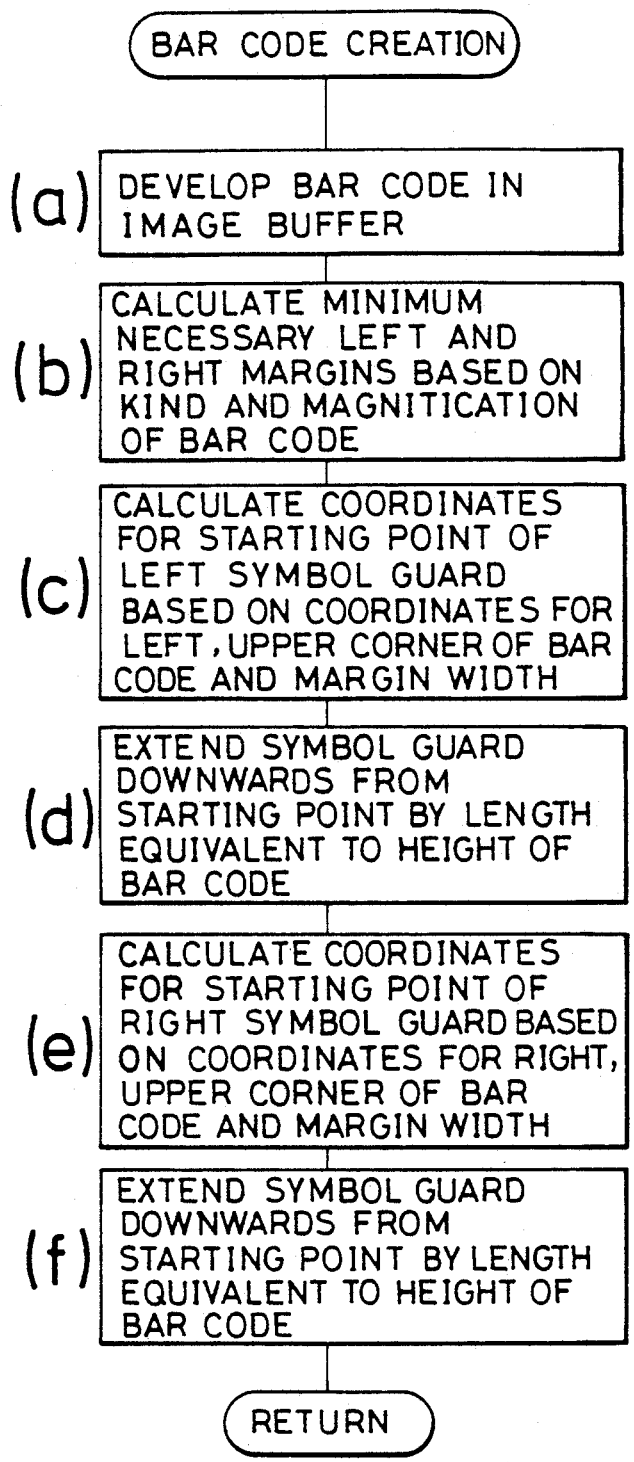
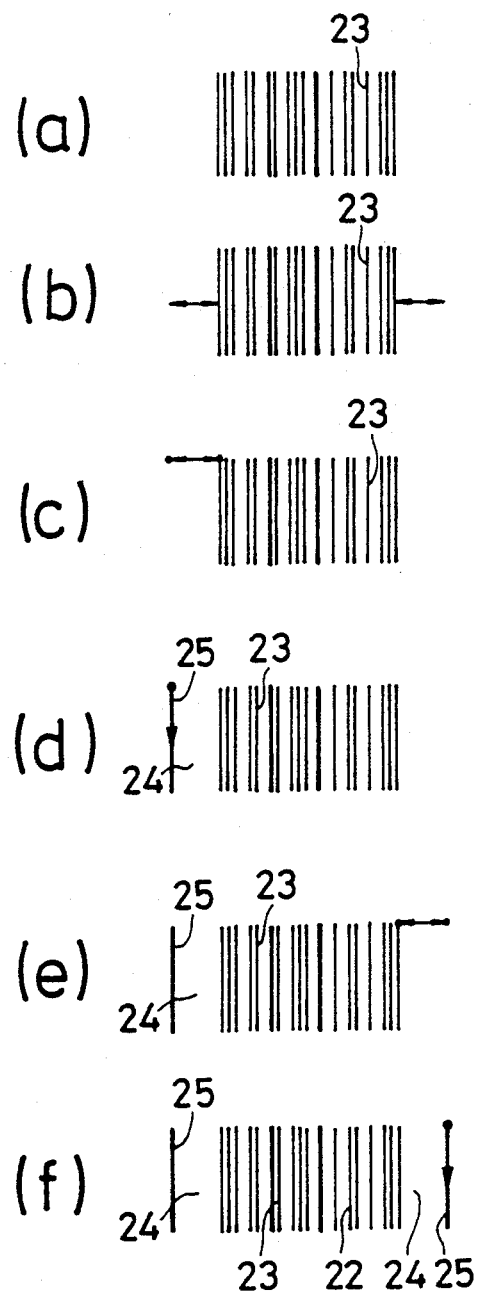

BAR CODE PRINTING METHOD AND THE PRINTER

BACKGROUND OF THE INVENTION

1. Field of the Invention and Related Art Statement

The present invention relates to a printing method and a printer for bar codes in which a variety of codes are formed by the combination of narrow lines and wide lines.

2. Discussion of the Background

Generally in the case of bar codes, many kinds of codes formed with the combination of narrow lines and wide lines are set and they are printed on sheets of printing paper by thermal printers.

As for printing methods there are two methods; one is a thermosensible method in which thermosensible paper is used for a printing medium and the other is an ink transcription method in which ink is transcribed through a printing ribbon on a printing medium of ordinary paper. In an ink transcription method a thermal transfer ink ribbon is used. Some printers are provided with stretching mechanisms for ribbons not to be slacken.

Even if any printing method is adopted, there are a plurality of standards in bar codes and in each standard the number of characters per unit dimension, the size of a narrow bar and the ratio between the sizes of a narrow bar and a wide bar are different. There are standard specifications and optional specifications in the kinds of bar codes. Standard specifications include (a) JAN, UPC, EAN
(b) NW-7
(c) CODE 39
(d) ITF etc., and optional specifications include (e) CODE 128
(f) CODE 93
(g) MSI
(h) others etc.

FIG. 12 (a), (b) and (c) show a printed example of a bar code 1 wherein a line thermal head of 7.6/mm dot density is used and narrow bars (NARROW) are 1 dot, 2 dots and 3 dots, and the ratio between the sizes of a narrow bar and a wide bar (WIDE) is 3 : 1. Usually on both ends of a bar code 1, guard bars 2 are disposed and there are margins 3 outside the guard bars 2.

When a bar code is printed by an ink transcription method using an ink ribbon, the ink ribbon can be locally shrunk by the influence of heat generated by a thermal head. In such a case, wrinkles occur in the ribbon and the ink once stuck on a sheet of printing paper re-adheres to the ribbon, a phenomenon called removableness, which degrades the printing quality of the bar code 1. Insufficient inking is apt to occur in both end parts of the bar code 1. It is caused by the fact that wrinkles are most likely to occur on the border between a printed region and a nonprinted region.

OBJECT AND SUMMARY OF THE INVENTION

An object of the present invention is to improve the print quality of bar code patterns by arranging not to produce wrinkles on an ink ribbon in the printing region of bar code patterns.

In the present invention, for a bar code formed with the combination of wide lines and narrow lines according to a predetermined standard, leaving fixed margins on both sides, symbol guards are printed along the height direction of the bar code pattern together with the bar code pattern with a thermal print head using a thermal transcription ink ribbon. Owing to the arrangement as described above, even if wrinkles on the thermal transcription ink ribbon occur in the vicinity of the symbol guards provided on both sides of the bar code pattern, the occurrence of wrinkles is prevented in the bar code print region. It is therefore possible to perform high quality bar code printing. The above-mentioned function is made certain all the more by starting the print of a symbol guard before that of the print of the bar code pattern.

BRIEF DESCRIPTION OF THE DRAWINGS

FIG. 3 is a flow chart showing a first embodiment of the present invention.

FIG. 4 is a plan view showing a bar code image corresponding to each part in FIG. 3.

DETAILED DESCRIPTION OF PREFERRED EMBODIMENTS

Figure 1A:
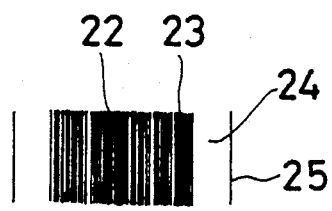
FIG. 1 is a plan view showing a bar code image in a first embodiment of the present invention.

A first embodiment according to the present invention will be explained referring to FIG. 1 to FIG. 4. As shown in FIG. 2, a thermal printer is provided with a CPU 4 to which a ROM 5 as a program memory and a RAM 6 having a built-in image buffer are connected. A SRAM 8 connected to a backup circuit 7 and a RAM card I/F 10 to which a RAM card 9 is connected are also connected to the CPU 4.

A thermal print head 11, a step-motor 12, a DC motor 13, etc. are provided in the printer. These step-motor 12 and DC motor 13 are respectively connected to the CPU 4 through a driving circuit 14 to be used for printing data, a step-motor driver 15 and a ribbon motor driver 16.

A sensor 18 is connected to the CPU 4 through a sensor I/F 17 and a keyboard 20, which works as a bar code designating means, is also connected to CPU 4 through a communication I/F 19. The CPU 4 is also connected to a host computer.

In the ROM 5 various kinds of bar codes are set, and the ROM 5 works as a bar code storing means.

Figure 1B:
Figure 1C:
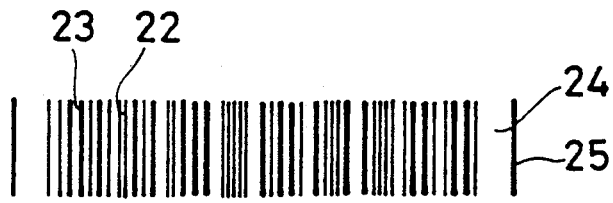
Figure 2:
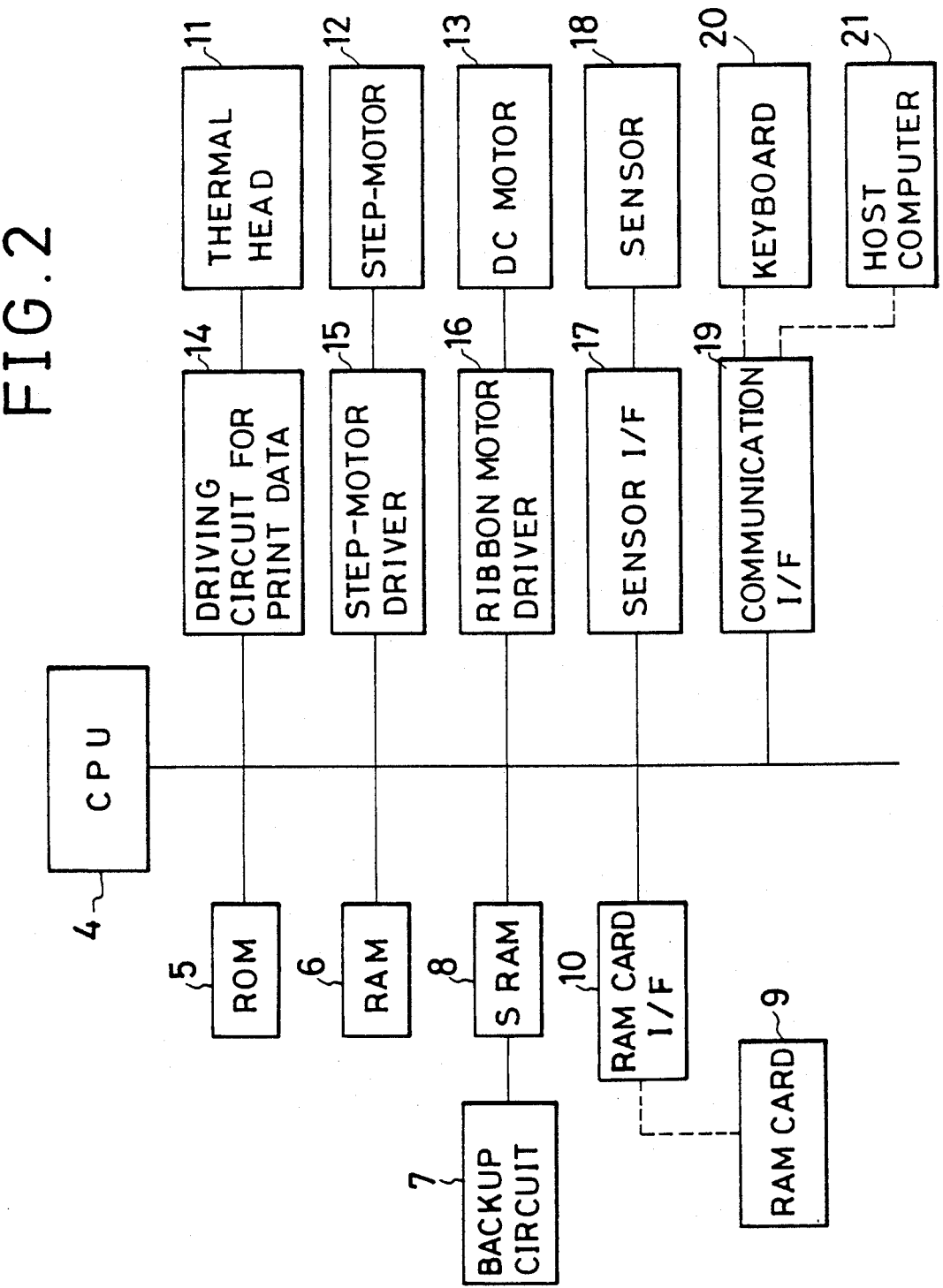
FIG. 2 is a block diagram of a bar code printer according to the present invention.
Figure 5:
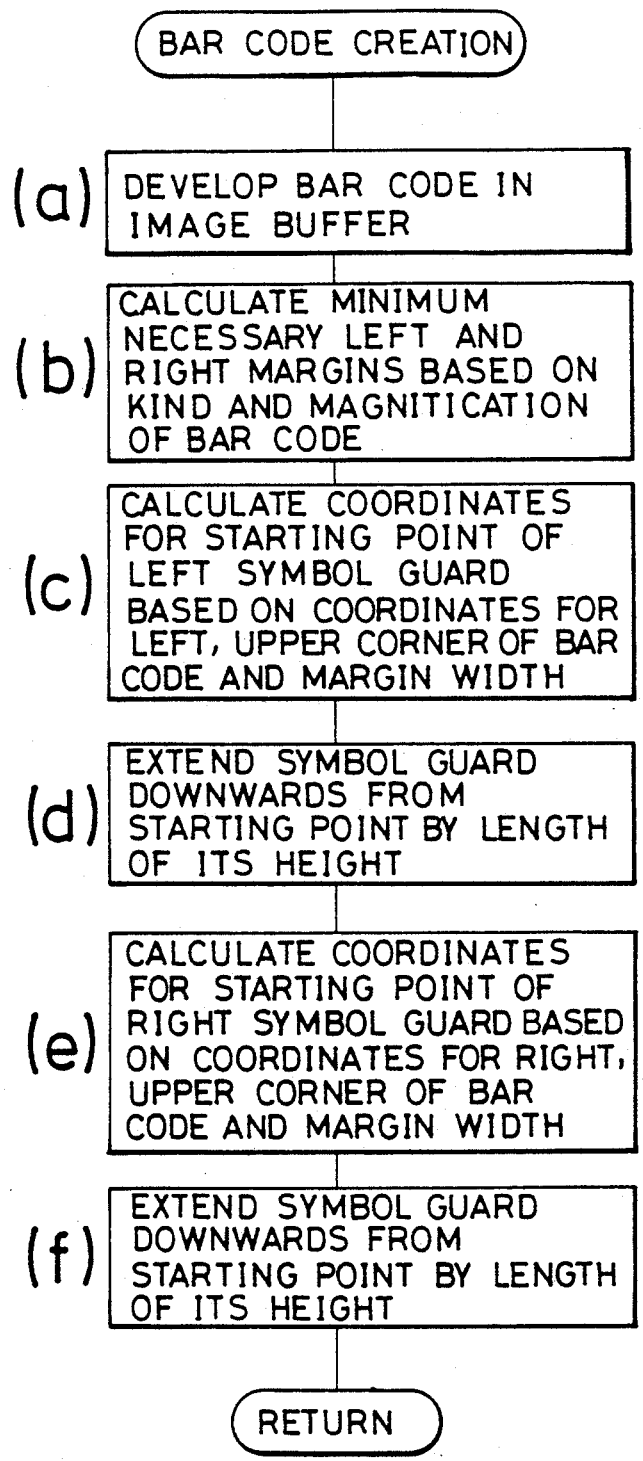
FIG. 5 is a flow chart showing a second embodiment of the present invention.
Figure 6:
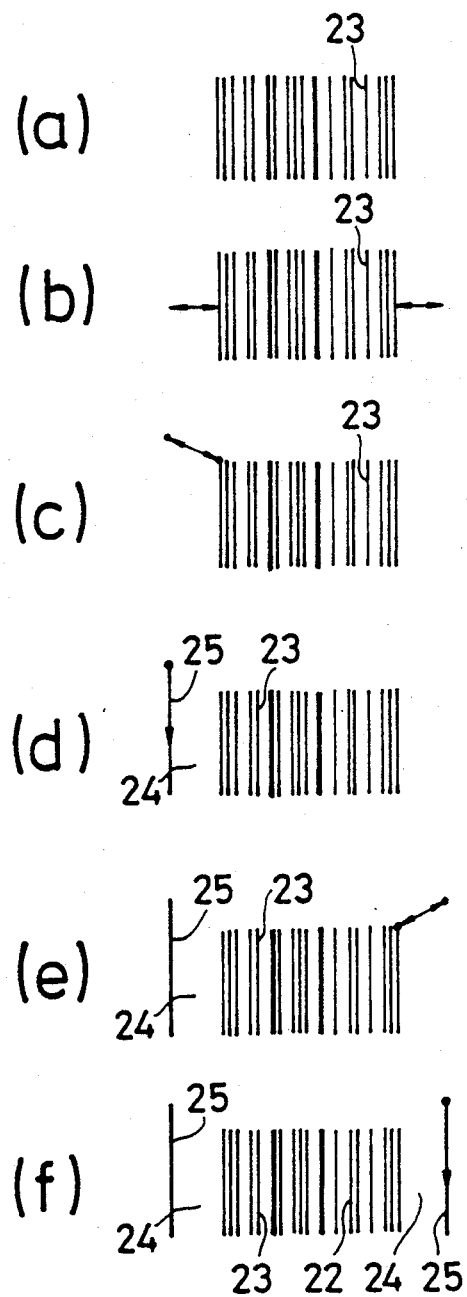
FIG. 6 is a plan view showing a bar code image corresponding to each part in FIG. 5.

As shown in FIG. 1, a bar code 22 comprises a usual bar code pattern 23 and symbol guards 25 provided on both sides of the bar code pattern 23, leaving margins of a fixed width outside the pattern 23. The width of a symbol guard coincides with that of a wide bar.

When bar code printing is performed in the configuration as mentioned above, the bar code 22 is designated by a command of the keyboard 20 or the host computer 21; therefore the keyboard 20 or the host computer 21 works as a bar code designating means.

In the designation of a bar code, at first the kind, magnifications, data and others are input. The bar code pattern 23 in the ROM 5 is pulled out by the input data and, based on the designating data, the bar code pattern 23 to be printed is developed in the image buffer in the RAM 6 [FIG. 3 (a)]. The minimum necessary margins on both sides are calculated based on the kind and magnifications of the bar code pattern 23 [FIG. 3 (b)]. The calculation of the margin width is automatically performed by a margin automatic setting means when the kind and the magnifications of the bar code pattern 23 are set. Next, the coordinates of the starting point of the left symbol guard is calculated based on the coordinates of the left, upper corner of the bar code pattern 23 and the calculated margin width [FIG. 3 (c)]. A symbol guard 25 shall be extended downwards to be about the same height as that of the bar code pattern 23 [FIG. 3 (d)]. The coordinates of the starting point of the right symbol guard is calculated based on the coordinates of the right, upper corner of the bar code pattern 23 and the calculated margin width [FIG. 3 (e)]. The symbol guard 25 shall be extended downwards to be about the same height as that of the bar code pattern 23 [FIG. 3 (f)].

The bar code image data thus manufactured are stored in an image buffer in the RAM 6. After that, by the thermal print head 11 which operates in synchronization with the drive of the stepmotor 12 and the DC motor 13, the ink from a thermal transcription ink ribbon is transcribed onto a label or a sheet of recording paper, and the bar code 22 is printed.

When the bar code 22 is printed, local shrinkage of the thermal transcription ink ribbon is caused by the heat generated in the thermal print head 11, but a printing region and a nonprinting region is separated by symbol guards 25 placed on both sides of the bar code pattern. Therefore, as for the printing of the symbol guards the transcription of ink from the thermal transcription ink ribbon can be insufficient but in the part of the bar code pattern 23 print quality is high and a correct print can be obtained. In other words, there is a probability that wrinkles on a thermal transcription ink ribbon will occur in the vicinity of symbol guards 25 but in the region of the bar code pattern 22 situated on the inner side of the symbol guards 25 the transcription of ink is performed normally.

A second embodiment of the present invention will be explained referring to FIG. 5 to FIG. 11. For the similar parts to those of the former embodiment, the same symbols are used and the explanation of them is omitted. In the second embodiment, the height of a symbol guard 25 is formed to be higher than that of a bar code pattern 23.

When a bar code printing is performed, the bar code 22 is designated with the command from the keyboard 20 or the host computer 21.

In the designation of a bar code, the kind, magnifications, data and others for the bar code pattern 23 are input. With the input of data a bar code pattern 23 in the ROM 5 is pulled out and, based on the designating data, a bar code pattern 23 to be printed is developed in the image buffer in the RAM 6 [FIG. 5 (a)]. And then, the minimum necessary width of left and right margins are calculated based on the kind and the magnifications of the bar code pattern 23 [FIG. 5 (b)]. Next, the coordinates of the starting point of the left symbol guard are calculated based on the coordinates of the left, upper corner of the bar code pattern 23 and the calculated margin width [FIG. 5 (c)]. The height of the symbol guard 25 is set to be higher than that of the bar code pattern, so that the starting point coordinates precede in position those of left, upper corner of the bar code pattern 23. A symbol guard 25 is extended downwards from the starting point by the length of its height [FIG. 5 (d)]. The coordinates of the stating point of the right symbol guard is calculated based on the coordinates of the right, upper corner of the bar code pattern 23 and the calculated margin width [FIG. 5 (e)]. The coordinates of the starting point precede in position the coordinates of the right, upper corner of the bar code pattern 23. A symbol guard 25 is extended downwards from the starting point by the length of its height [FIG. 5 (f)].

A bar code image formed in this way is stored in an image buffer in RAM 6. After that, the ink on a thermal transcription ink ribbon is transcribed onto a label or a sheet of recording paper with the thermal print head 11 which operates in synchronization with the drive of the step-motor 12 and the DC motor 13; thus a bar code 22 is printed.

When the bar code 22 is printed, local shrinkage of a thermal transcription ink ribbon is caused by the heat generated in a thermal print head 11. A printed region and a non-printed region are separated by symbol guards 25 placed along both sides of the bar code pattern; therefore as for the printing of the symbol guard 25 the transcription of ink from a thermal transcription ink ribbon can be insufficient. Even if the ink transcription in this part is insufficient, the print quality in the part of the bar code pattern 23 is high and secure printing is performed. In other words, there is a high probability that wrinkles on a thermal transcription ink ribbon will occur in the vicinity of the symbol guards 25 but in the part of the bar code 23 placed on the inner side of the symbol guards, ink transcription is performed in a normal condition under which no wrinkle occurs on a thermal transcription ink ribbon.

FIG. 7 to FIG. 11 show the examples of variations of symbol guards 25.

Figure 7:
FIG. 7 to FIG. 11 are plan views showing the examples of pattern variations of symbol guards.

FIG. 7 shows a symbol guard 25 formed with a broken line.

Figure 8:

FIG. 8 shows a symbol guard 25 formed with a continuation of rhombic patterns.

Figure 9:
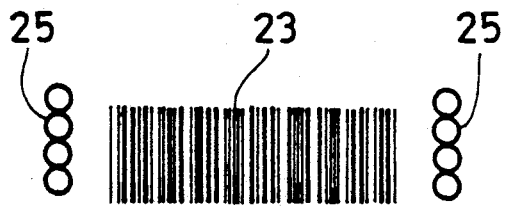

FIG. 9 shows a symbol guard 25 formed with a continuation of circular patterns.

Figure 10:
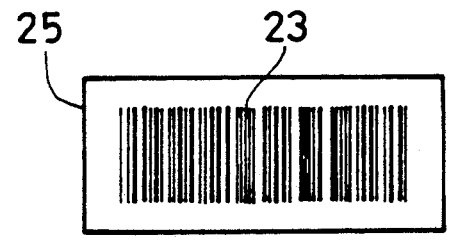

FIG. 10 shows a symbol guard 25 formed with a full line which surrounds the whole of the bar code pattern 23.

Figure 11:
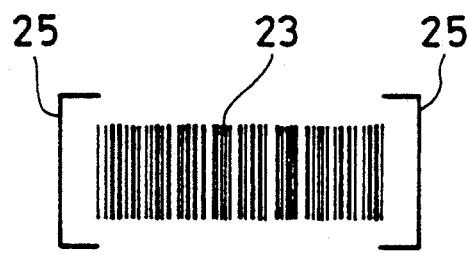
Figure 12A:
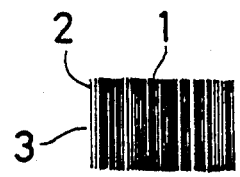
FIG. 12 are plan views showing the forms of conventional bar codes.
Figure 12B:
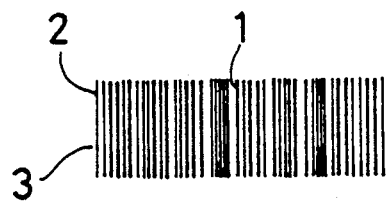
Figure 12C:
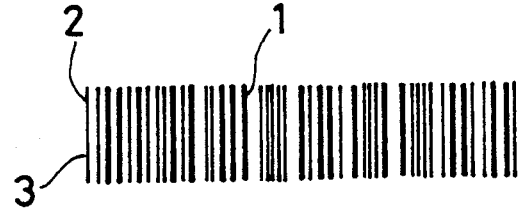

FIG. 11 shows a symbol guard 25 formed with a bracket-shaped pattern, part of a frame surrounding both sides of the bar code pattern 23.

Each of these variations of symbol guards 25 has a height higher than that of a bar code pattern 23; a symbol guard 25 is therefore printed prior to the printing of the bar code pattern 3.

The symbol guards according to the present invention are not limited to the examples shown in above-mentioned embodiments; their heights or print sizes can be arbitrarily set and many kinds of variations can be executed as far as they do not deviate from the point of the present invention.

What is claimed is:

1. A method of printing a bar code pattern with a printer comprising a thermal print head using a thermal transcription ink ribbon, comprising the steps of:

printing the bar code pattern formed of a combination of wide lines and narrow lines having been previously standardized;

determining a fixed margin on sides of the bar code pattern;

printing symbol guards on the sides of the printed bar code pattern with the determined fixed margin separating the symbol guards from the bar code pattern, wherein placement of said symbol guards reduces incomplete printing of the bar code pattern by said ink ribbon.

2. The method according to claim 1, wherein the height of the symbol guards is the same as that of the bar code pattern.

3. The method according to claim 1, wherein said bar code pattern is printed prior to printing said symbol guards.

4. The method according to any one of claims 1-3, wherein the symbol guards are formed with one or ones selected from a full line, a broken line, characters, patterns, a frame, surrounding the bar code pattern.

5. A bar code printing method according to any one of claim 1-3, wherein the height of the symbol guards is made higher than that of the bar code pattern.

6. A bar code printing method according to any one of claims 1-3, wherein the symbol guards are formed with a frame surrounding the whole or part of the bar code pattern.

7. A bar code printer comprising:
a bar code storage means for storing a variety of bar code patterns;
a bar code designating means for designating a bar code pattern to be printed;
a symbol guard setting means for setting symbol guards on both sides of the designated bar code pattern, leaving fixed margins between the designated bar code pattern and the symbol guards;
an image buffer for storing a bar code pattern formed with said bar code designating means and said symbol guard setting means;
a thermal print head for printing the contents of the image buffer;
a thermal transcription ink ribbon to be interposed between the thermal print head and a sheet of recording paper;
wherein placement of said symbol guards reduces incomplete printing of the bar code pattern by said ink ribbon.

* * * * *